United States Patent
Mongia et al.

(10) Patent No.: US 9,189,073 B2
(45) Date of Patent: Nov. 17, 2015

(54) TRANSITION MECHANISM FOR COMPUTING SYSTEM UTILIZING USER SENSING

(75) Inventors: Rajiv Mongia, Fremont, CA (US); Achintya Bhowmik, Cupertino, CA (US); Mark Yahiro, Santa Clara, CA (US); Dana Krieger, Emeryville, CA (US); Ed Mangum, San Mateo, CA (US); Diana Povieng, San Francisco, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/997,978

(22) PCT Filed: Dec. 23, 2011

(86) PCT No.: PCT/US2011/067280
§ 371 (c)(1),
(2), (4) Date: Jun. 25, 2013

(87) PCT Pub. No.: WO2013/095671
PCT Pub. Date: Jun. 27, 2013

(65) Prior Publication Data
US 2014/0015804 A1    Jan. 16, 2014

(51) Int. Cl.
*G06F 3/042* (2006.01)
*G06F 3/01* (2006.01)
(Continued)

(52) U.S. Cl.
CPC .............. *G06F 3/017* (2013.01); *G06F 1/3231* (2013.01); *G09G 5/00* (2013.01); *G09G 2340/14* (2013.01); *G09G 2354/00* (2013.01); *Y02B 60/1289* (2013.01)

(58) Field of Classification Search
CPC ......... G06F 1/3231; G06F 3/01; G06F 3/011; G06F 3/017; G09G 2354/00; G09G 2340/14; G09G 5/00
USPC .................... 345/173–178; 178/18.01–18.09, 178/20.01–20.04
See application file for complete search history.

(56) References Cited

U.S. PATENT DOCUMENTS

| 6,222,465 B1 | 4/2001 | Kumar et al. |
| 7,030,861 B1 | 4/2006 | Westerman et al. |

(Continued)

FOREIGN PATENT DOCUMENTS

| CA | 2768893 | 2/2011 |
| TW | 393629 | 6/2000 |

(Continued)

OTHER PUBLICATIONS

International Search Report and Written Opinion of the International Searching Authority mailed Aug. 28, 2012, in International Patent Application No. PCT/US2011/067280, 10 pages.

(Continued)

*Primary Examiner* — Vijay Shankar
(74) *Attorney, Agent, or Firm* — Blakely, Sokoloff, Taylor & Zafman LLP

(57) ABSTRACT

A transition mechanism for a computing system utilizing user sensing. An embodiment of an apparatus includes a sensing element to sense a presence or movement of a user of the apparatus, a processor, wherein operation of the processor includes interpretation of user gestures to provide input to the apparatus, and a light generation element to generate a light to indicate existence of a virtual boundary of the apparatus. The computing device is to change from a first state to a second state upon the sensing element sensing that at least a portion of the user is within the virtual boundary.

19 Claims, 8 Drawing Sheets

(51) Int. Cl.
  *G06F 1/32* (2006.01)
  *G09G 5/00* (2006.01)

(56) References Cited

U.S. PATENT DOCUMENTS

| | | |
|---|---|---|
| 7,274,803 B1 | 9/2007 | Sharma et al. |
| 7,519,223 B2 | 4/2009 | Dehlin et al. |
| 7,849,421 B2 | 12/2010 | Yoo et al. |
| 7,924,271 B2 | 4/2011 | Christie et al. |
| 8,181,123 B2 | 5/2012 | Stone-Perez et al. |
| 8,448,083 B1 | 5/2013 | Migos et al. |
| 8,693,724 B2 * | 4/2014 | Ahmed et al. ............... 382/103 |
| 2002/0064382 A1 | 5/2002 | Hildreth et al. |
| 2005/0003851 A1 | 1/2005 | Chrysochoos et al. |
| 2006/0036944 A1 | 2/2006 | Wilson |
| 2006/0187196 A1 | 8/2006 | Underkoffler et al. |
| 2006/0209021 A1 * | 9/2006 | Yoo et al. ..................... 345/156 |
| 2008/0005703 A1 | 1/2008 | Radivojevic |
| 2008/0036732 A1 | 2/2008 | Wilson et al. |
| 2008/0120577 A1 | 5/2008 | Ma et al. |
| 2008/0231926 A1 | 9/2008 | Klug et al. |
| 2009/0217211 A1 | 8/2009 | Hildreth et al. |
| 2010/0031202 A1 | 2/2010 | Morris et al. |
| 2010/0031203 A1 | 2/2010 | Morris et al. |
| 2010/0045705 A1 | 2/2010 | Vertegaal et al. |
| 2010/0199232 A1 | 8/2010 | Mistry et al. |
| 2010/0280988 A1 | 11/2010 | Underkoffler et al. |
| 2010/0281436 A1 | 11/2010 | Kipman et al. |
| 2010/0281437 A1 | 11/2010 | Stone-Perez et al. |
| 2011/0115702 A1 | 5/2011 | Seaberg |
| 2011/0197263 A1 | 8/2011 | Stinson, III |
| 2011/0219340 A1 | 9/2011 | Pathangay et al. |
| 2011/0221669 A1 | 9/2011 | Shams et al. |
| 2011/0258537 A1 | 10/2011 | Rives et al. |
| 2011/0283212 A1 | 11/2011 | Warner |
| 2011/0296353 A1 | 12/2011 | Ahmed et al. |
| 2012/0084688 A1 | 4/2012 | Robert et al. |
| 2012/0169670 A1 | 7/2012 | Kim et al. |
| 2012/0249741 A1 | 10/2012 | Maciocci et al. |

FOREIGN PATENT DOCUMENTS

| | | |
|---|---|---|
| TW | 201037577 | 10/2010 |
| TW | 201120681 | 6/2011 |
| TW | 201137766 | 11/2011 |
| WO | WO-2011/066343 | 6/2011 |

OTHER PUBLICATIONS

International Search Report and Written Opinion of the International Searching Authority mailed Aug. 28, 2012, in International Patent Application No. PCT/US2011/067287, 10 pages.

International Search Report and Written Opinion of the International Searching Authority mailed Aug. 28, 2012, in International Patent Application No. PCT/US2011/067289, 10 pages.

International Search Report and Written Opinion of the International Searching Authority mailed Aug. 28, 2012, in International Patent Application No. PCT/US2011/067290, 10 pages.

Office Action including Search Report, dated Sep. 23, 2014 (+ English translation), in Taiwan Patent Application No. 101146399, 19 pages.

Official Letter dated Jul. 28, 2014 (+ English translation), in R.O.C. (Taiwanese) Patent Application No. 101149340, 13 pages.

Office Action dated Feb. 24, 2015 (+ English translation), in Taiwan Patent Application No. 101147201, 15 pages.

Office Action mailed Jun. 12, 2015, in U.S. Appl. No. 13/997,639, 14 pages.

Office Action mailed Jun. 18, 2015, in U.S. Appl. No. 13/997,634, 12 pages.

Office Action mailed Mar. 27, 2015, in U.S. Appl. No. 13/997,640, 17 pages.

Official Letter dated Mar. 2, 2015 (+ English translation), in Taiwan Patent Application No. 101145913, 16 pages.

Extended European Search Report dated Jul. 22, 2015, in European Patent Application No. 11878127.7, 6 pages.

* cited by examiner look in to log in...

welcome back, Mark...

TRANSITION MECHANISM FOR COMPUTING SYSTEM UTILIZING USER SENSING

CROSS-REFERENCE TO RELATED APPLICATION

This application is a national phase of PCT/US2011/067280 filed Dec. 23, 2011, which application is incorporated herein by reference in its entirety.

TECHNICAL FIELD

Embodiments of the invention generally relate to the field of computing systems and, more particularly, to a transition mechanism for a computing system utilizing user sensing.

BACKGROUND

Computing systems and related systems are being developed to provide a more natural interface for users. In particular, computing systems may include sensing of a user of the computing system, where user sensing may include gesture recognition, where the system attempts to recognize one or more gestures of a user, and in particular hand gestures of the user.

However, conventional systems often lack the ability to discern the intention of users. Among other problems, gestures used to communicate with a computing system also are used for many other purposes, thus making it difficult for the computing system to recognize when a gesture is intended.

In particular, a computing system may have difficulty in determining when a user intends to make transitions with the computing system, such as to enter into computing system operation and to exit computing system operation, without requiring awkward or unnatural operations by the user. Similarly, a user may have difficulty in naturally recognizing the status of the computing system with regard to such transitions by the user.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
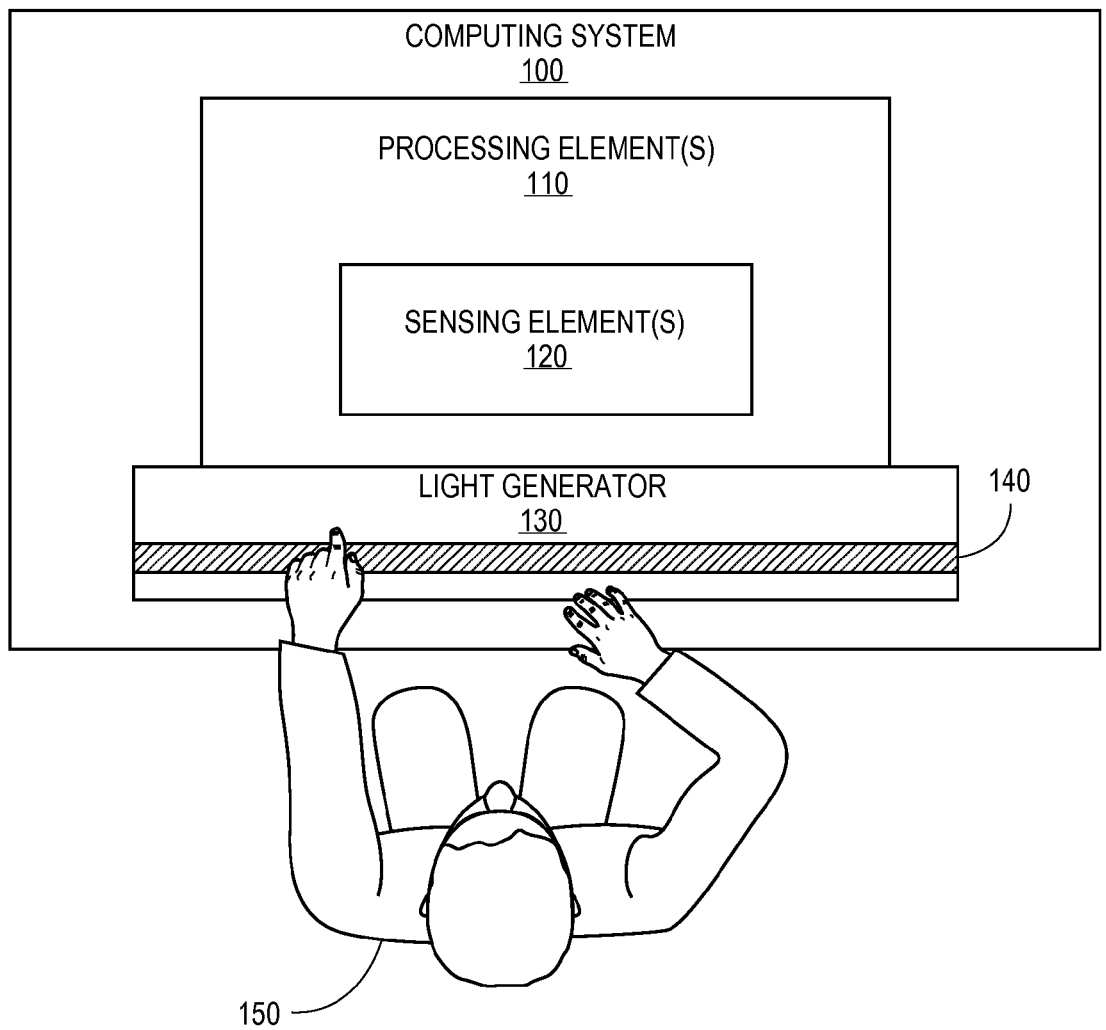
FIG. 1 illustrates an embodiment of a computing system including a mechanism to handle transitions for a user in relation to the computing system.

Embodiments of the invention are generally directed to entry and exit mechanism for computing system gesture recognition.

As used herein:

"User sensing" means a computer operation to sense a user. The sensing of a user may include position and motion detection, such as a computing system detecting and interpreting gestures made by a user of the computing system as inputs to the computing system. User sensing may utilize any technology by which the user may be sensed by the computing, including visual sensing (using one or more cameras or similar devices), sound sensing (including detection of sounds and detection of sound reflection), heat or infrared sensing, sensing and interpretation of projected light patterns (visible or invisible), and other technologies. User sensing may include operations of a perceptual computing system in sensing user operations and intent, where a perceptual computing system is a system allowing for the addition of alternative input modalities, including gesture recognition.

"Computing system" means any device or system that includes computing capability. A computing system includes both a single unit, such as a laptop computer, and a system of multiple elements. A computing system is not limited to a general-purpose computer, but also includes special purpose devices that include computing capability. A "computing system" includes a desktop computer, a game console, a laptop or notebook computer, an all-in-one (AIO) computer, a tablet computer, a handheld computing device including a smart phone, or other apparatus or system having computing and display capability.

In a computing system framework utilizing user sensing to detect system inputs, there are no tactile cues to tell the user that they are interfacing with the computing system. Similarly, there are generally no concrete cues that the computing device can use in order to confirm the user's intent to interact with the computing device (i.e., what are intended gestures versus unintended gestures).

In some embodiments, a computing system includes a transition mechanism to detect and provide feedback regarding transitions of the user in relation to the computing system.

In some embodiments, an intent of the user to interact with a computing system is determined by the motion of the user, such as by a user's hand or hands, toward an element of the computing system. While embodiments are not limited to a user's hands, this may the most common operation by the user. In some embodiments, the element of the computing system towards which the user is moving is a display screen of the computing system, providing a natural interaction with the computing system. In some embodiments, the intent of the user is determined when the computing system senses that the user (the user's hand or other element) crosses a line or plane in space, where the line may be an "imaginary" line in space, which is generally referred to herein as a "virtual boundary". Once at least a portion of the user (such as a hand of the user) crosses the virtual boundary, the computing device may interpret the user's actions as intent and react accordingly. In some embodiments, the computing device may further use context awareness (based on knowledge of the context of the user's action) in order to determine an intent by the user to move towards the computing system to "enter" the space of the computing system. Movement towards or away from the computing system may be referred to as motion along the Z-axis, as opposed to movement in the X-axis (horizontal or side to side in relation to the computing system) and movement in the Y-axis (vertical or up and down in relation to the computing system).

In some embodiments, a computing system determines or establishes the location of a virtual boundary in space for a user. In some embodiments, the virtual boundary may be different from user to user. In some embodiments, the virtual boundary may vary by context for a single user. In some embodiments, rather than determine, for example, a single arbitrary line at a distance from the screen, the computing device may establish the virtual boundary based on sensing of the user's position and location relative to the computing system. For example, the computing system may monitor the position of the user's head, elbows, or shoulders, or any combination thereof, relative to the user's hands along the Z-axis.

In some embodiments, in order to provide a psychological line or clue indicating when the user enters the computing space, an illuminated line is provided by the computing device in order to provide feedback. In some embodiments, the illuminated line provided by the light element is used to provide an indication of the existence of the virtual boundary, and to provide indications that the user has crossed the virtual boundary into a new interaction model. In some embodiments, the light element provides a light indicating a location of the virtual boundary, and in some embodiments the light may be in a different location than the virtual boundary, such as, for example, where there is an offset between the light and the virtual boundary. In some embodiments, an illuminated line designating the virtual boundary is used to provide feedback to a user with regard to operation of the computing system.

In some embodiments, a color of the illuminated line may be used to indicate a certain status concerning the user in relation to the computing system. In some embodiments, the illuminated line may illuminate as a first color (such as blue) when the user has entered the computing space. Further, the illuminated line may illuminate as a second color (such as white) when the user has crossed the virtual boundary, and may be performing a gesture that corresponds to a gesture that is contained in a gesture library that is accessible to the computing system, and as a third color (such as red) when the user makes a mistake (generating an error state) or resets the system to a "Home" position. Embodiments are not limited to these elements, and additional colors and feedback may indicate other states for a computing system with regard to a user.

In a particular example of a computing system being a laptop computer, the illuminated line may be generated by a lighting element in the laptop computer, such as a light element installed in or on the laptop computer. In one example, the lighting element may be located running in a horizontal direction between, for example, a palm rest and a keyboard of the laptop computer.

In some embodiments, the illuminated line may be produced by other light generating sources, such as a separate element of the computing system, a light installed in a work surface, or other light source. In the case of a peripheral being used as the computing system input engine, the computing system may utilize lights or illuminated lines on the peripheral as the feedback mechanism. As an alternative, the peripheral may project a line to the surface in front of it to indicate the region where gestures for the computing system are recognized. This may, for example, consist of a diode laser in conjunction with a cylindrical lens in order to generate a laser sheet. When the sheet hits the surface in front of the computing system peripheral or the hands of the user, a visual cue to the user is generated with regard to the existence or location of a virtual boundary for the computing system.

In some embodiments, a computing system further includes a mechanism to provide indications on the display screen in relation to the sensed position of the user. In some embodiments, the indication relate to transitions of the user in relation to the operation of the computing system.

For example, a computing system may provide visual indications or images of a "log-in" process, home page configuration, and interactions when the computing system detects that a user has entered the computing system environment.

In some embodiments, a login screen may include a set of symbols, where the symbols may be a set of tiled windows, computing icons, or other symbols. In some embodiments, the set of symbols may be displayed together with a background (referring to any other portion of the display screen other than the set of symbols) that may provide motion, change in color, or other visual operations, including a star field or other type of background. Thus, a screen may initially include a version of a home screen that has been reduced in size and placed in a background. In some embodiments, when the computing system senses the presence of the user using a sensing element, the background starts to respond to the user presence using visual cues. This is done by actions such as shimmering or coagulation of stars, waves in grass, or other visual cues. In some embodiments, the visual cues are generated in response to a sensed presence of the person within a field of view of the 3D camera, by sound, or other sensing means.

In some embodiments, an image of the tiled windows or other symbols of the home screen is initially small, encouraging the user to lean toward the system to engage with the computing system. In some embodiments, upon the user leaning into the system, the computing system may initiate engagement with the user, wherein initiation may include the symbols of the home page becoming closer or larger. In some embodiments, the initiation of engagement may include performing authentication or recognition of the user, such as conducting facial recognition for authentication. In some embodiments, the computing system may respond back to the user asking if the correct identity has been provided for the user. Upon the user providing acknowledgement or confirmation, such as a gesture, verbal, key click, mouse click, or other type of confirmation, entry to a "Home Page" is realized by the computing system.

In some embodiments, in entry to the Home Page, the Home Page will become larger to fill the display screen. In some embodiments, the Home Page will be displayed to "fly toward" the user, thus suggesting an element of 3D interaction. In some embodiments, this 3D effect may be achieved through a change in perspective in the case of a 2D display, or by Z-axis movement (such as movement that appears to be moving towards the user) in the case of a 3D display.

In some embodiments, upon entering into the Home Page, the series of icons or other symbols of the home page appear on the screen, where the icons or symbols may be shaped icons represent a combination of applications, files, folders, or combination thereof. In some embodiments, the icons may have 3D shapes. In some embodiments, in order to encourage the mind of the user to perceive that the user is in a 3D gestural space, the perspective of the 3D icons nay shift when the user shifts the user's perspective. This shift may be done in natural 3D in the case of a 3D display, and may be achieved by parallax in the case of a 2D display.

In some embodiments, an apparatus includes a sensing element to sense a presence or movement of a user of the apparatus, a processor, wherein operation of the processor includes interpretation of user gestures to provide input to the apparatus, and a light generation element to generate a light to indicate existence of a virtual boundary of the apparatus. The computing device is to change from a first state to a second state upon the sensing element sensing that at least a portion of the user is within the virtual boundary.

In some embodiments, a method includes generating a light to indicate existence of a virtual boundary for a computing system; sensing a presence or movement of a user of the apparatus, where the sensing includes interpretation of user gestures to provide input to the computing system; and changing the computing system from a first state to a second state upon sensing that at least a portion of the user is within the virtual boundary.

FIG. 1 illustrates an embodiment of a computing system including a mechanism to handle transitions for a user in relation to the computing system. In some embodiments, a computing system 100 (viewed from above) includes one or more processing elements 110 to operate the computing system 100. In some embodiments, the computing system includes one or more sensing elements 120 to sense a user 150 of the system, where the sensing elements 120 may include one or more cameras or other visual sensing elements, one or more microphones or other audio sensing elements, one or more infrared or other heat sensing elements, or any other element for sensing the presence or movement of a user. Sensing elements may include multiple different elements working together, working in sequence, or both. For example, sensing elements may include elements that provide initial sensing, such as light or sound projection, following by sensing for gesture detection by, for example, an ultrasonic time of flight camera or a patterned light camera.

In some embodiments, the computing system includes a light generator 130 to produce an illuminated line 140. In some embodiments, the illuminated line 140 provides a visual cue regarding a virtual boundary in space, the virtual boundary being an imaginary or virtual location in space, where action of the user 150 to pass or break through the virtual boundary or plane is interpreted as an intent to engage with the computing system 100. In some embodiments, the illuminated line may change colors as the computing system transitions into different states with regard to the user 150.

Figure 6:
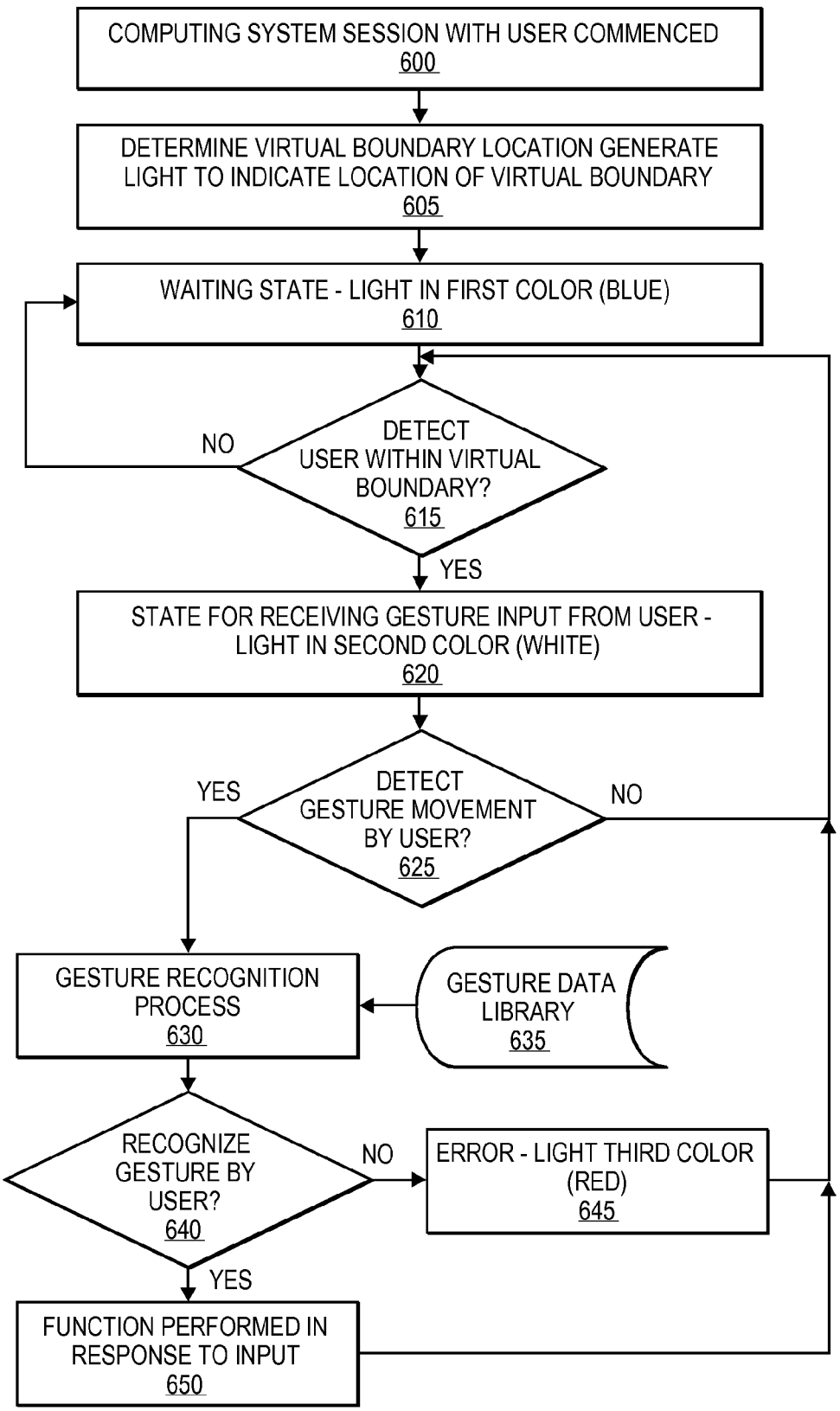
FIG. 6 is a flowchart to illustrate an embodiment of a process for transitions of a state of a computing system in connection with recognition of gestures by a user.

Certain additional elements of the computing system are illustrated in FIG. 6.

Figure 2:
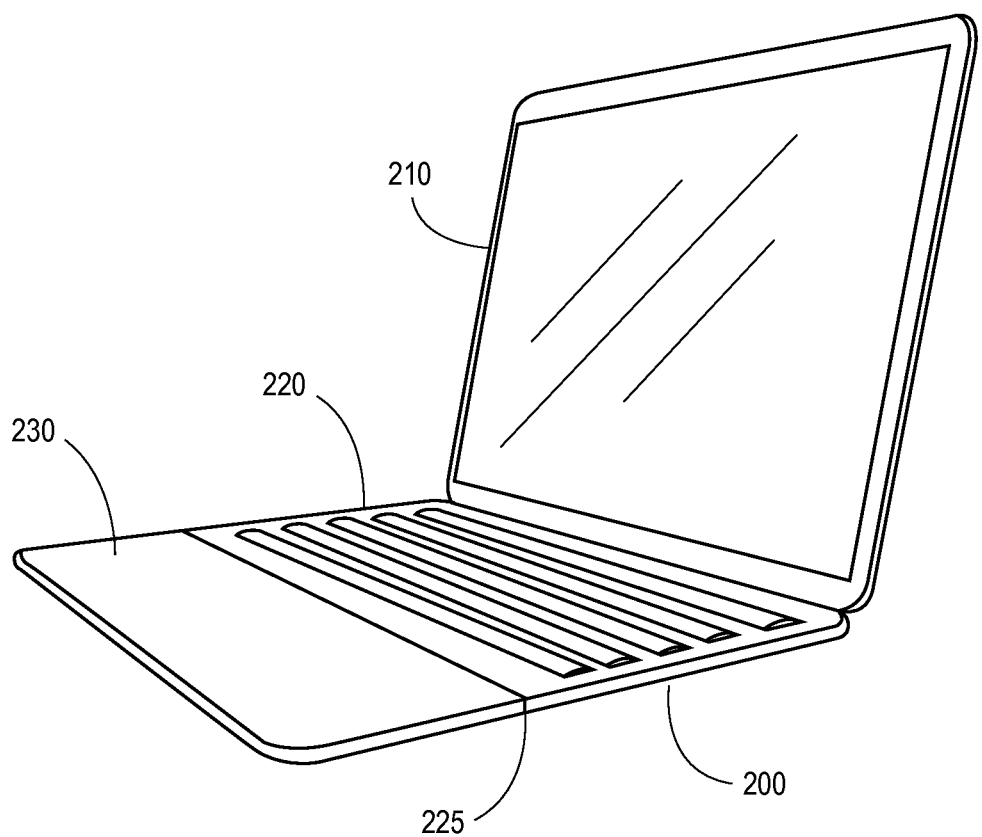
FIG. 2 illustrates as embodiment of a laptop computer to sense users including a transition mechanism.

FIG. 2 illustrates as embodiment of a laptop computer to sense users including a transition mechanism. In some embodiments, a computing system is in the particular form of a laptop computer 200. In some embodiments, the computer includes one or more sensing elements (not illustrated here) that are built into or connected to the computer 200. The computer 200 may further include a display screen 210 to provide displayed images to a user, a keyboard 220 to allow a user to provided data inputs to the computer 200, and a palm rest 230 or other extension of the laptop computer 200 beyond the keyboard 220.

In some embodiments, the computer 200 further includes a light generator 225 to produce an illuminated line, where the illuminated line may be used to provide a visual cue for the user of a virtual boundary in space, the virtual boundary utilized by the computing system to determine transitions in state of the computer 200 with regard to the user, including determining when the user wishes to engage with the computer 200.

Figure 3:
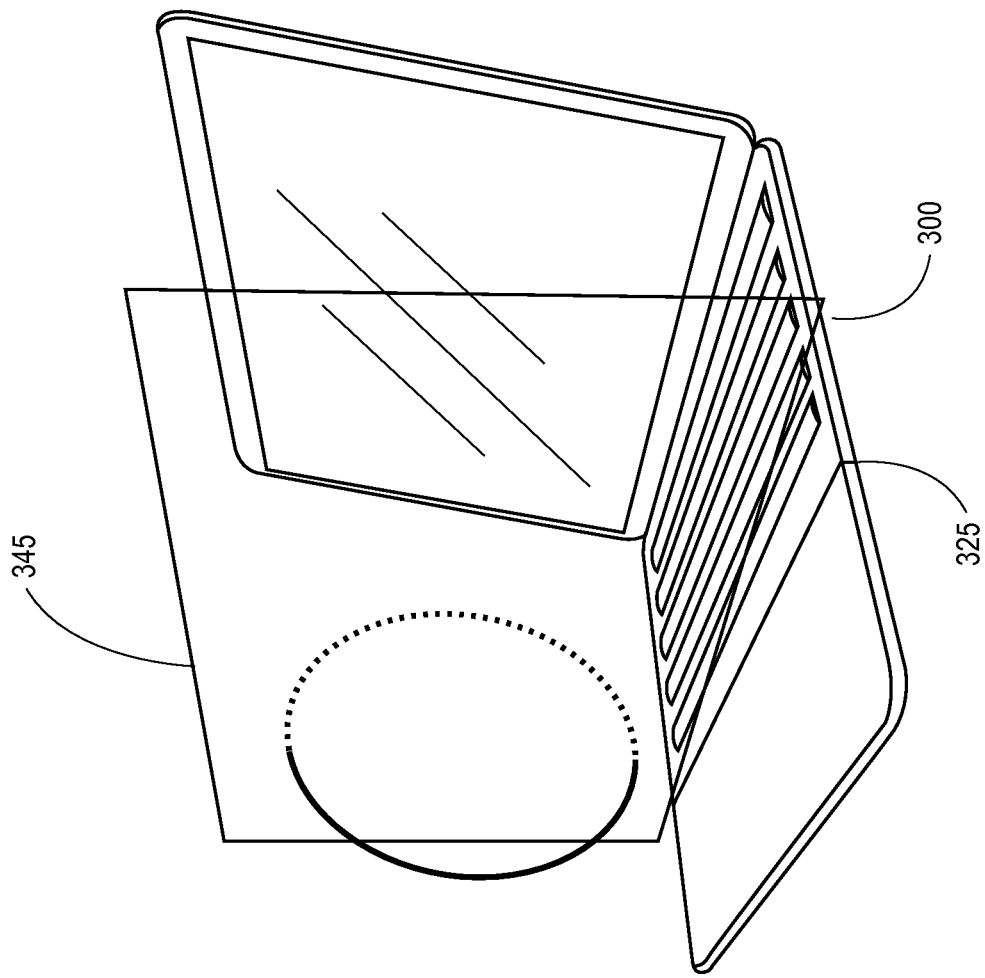
FIG. 3 illustrates an embodiment of a computing system providing for engagement of a user using a transition mechanism.
Figure 3:
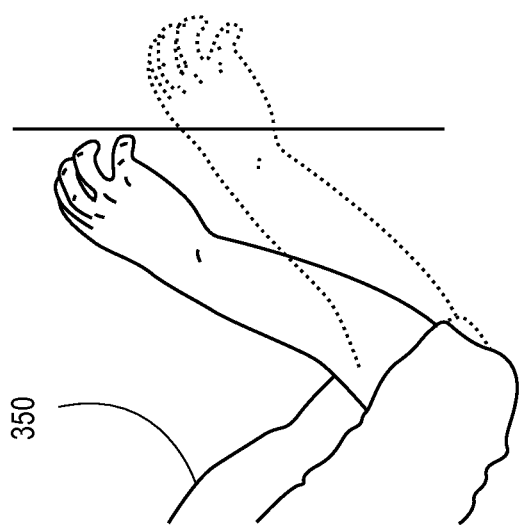

FIG. 3 illustrates an embodiment of a computing system providing for engagement of a user using a transition mechanism. In some embodiments, a laptop computer 300 includes one or more sensing elements (not illustrated here) that are built into or connected to the computer 300. The computer 300 further includes a light generator 325 to produce an illuminated line, where the illuminated line may be used to provide a visual cue for a user 350 of a virtual boundary in space 345.

In some embodiments, the computer 300 senses the position of the user 350, and operates to interpret the movement of a hand of the user 350 through the virtual boundary 345 as a gesture indicating an intension of the user 350 to engage with the computer 300. In some embodiments, upon the user passing through the virtual line or plane 345 the light generated by the light generator may change, thereby providing visual feedback to the user 350 that the user has entered an area for providing gestures to provide input to the computer 300.

Figure 4:
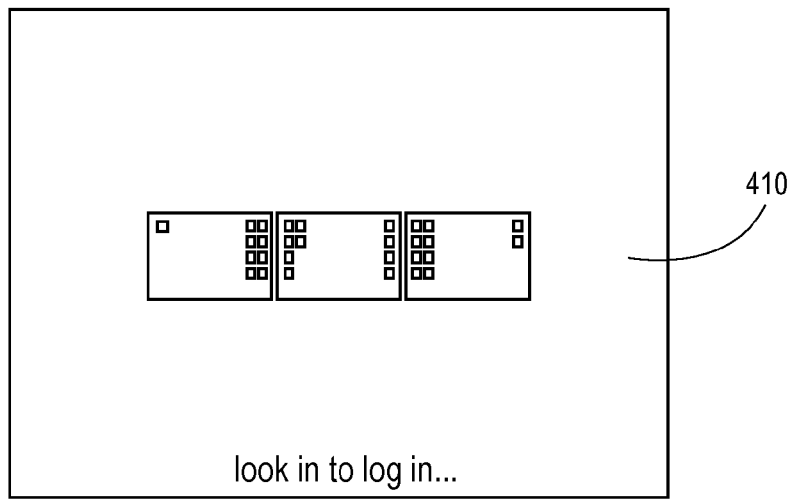
FIG. 4 illustrates display screens generated by an embodiment of a computing system to provide visual indications of transitions of state of the computing system with regard to a user.
Figure 4:
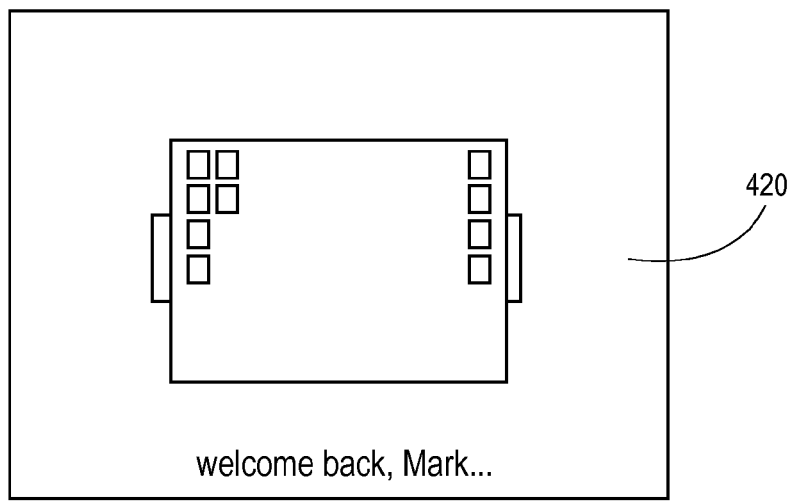
Figure 4:
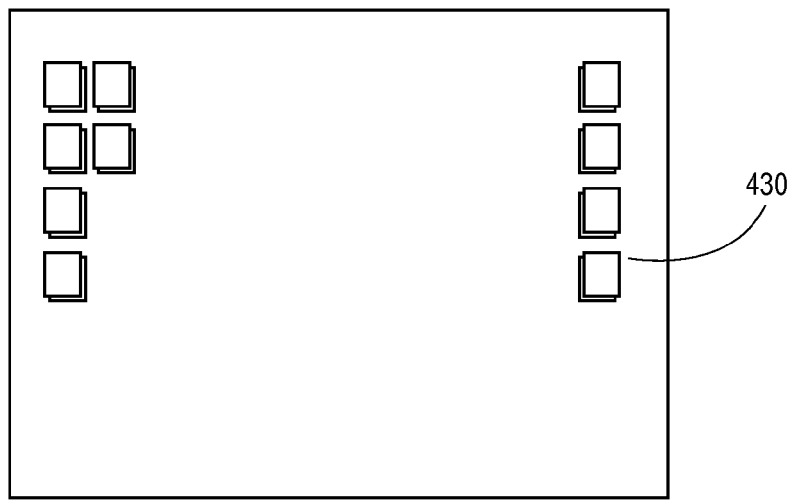

FIG. 4 illustrates display screens generated by an embodiment of a computing system to provide visual indications of transitions of state of the computing system with regard to a user. In, some embodiments, the display screens may be generated by a computing system that operates to sense a position of the user, including computing system 100 illustrated in FIG. 1. In some embodiments, a first screen 410 may be provided in a first state, where the first state may be a state in which the presence of a user, such as user 150 illustrate in FIG. 1, is sensed by the computing system, such as through use of the one or more sensing elements 120. In some embodiments, the first screen 410 may include a home screen image, the home screen image including a set of symbols such as icons, where the home screen image is reduced in size and surrounded by a background image. The background image may be, for example, a star field or other image that may change in response to changes in position of the user. In some embodiments, the background image may change in response to sounds detected by the computing system, such as; for example, sounds of a user in speaking or moving in the vicinity of the computing system. In some embodiments, the background image may change in response to a combination of factors relating to sensing the presence and movement of the user in the vicinity of the computing system. The screen 410 may include text requesting the user to move closer to the computing system, but this is not required in all embodiments.

In some embodiments, upon the user moving close enough to the computing system the computing system may act to sense the identity of the user, such as by facial recognition. In some embodiments, transition to a second screen 420 may be provided in a second state, where the second state may be a state in which the computing system has recognized the identity of the user, the screen providing visual feedback to the user that the user has transitioned into a new state. In some embodiments, the computing system may respond back to the user asking if the right person has been detected, and, the user providing confirmation, entry to the Home Page is provided.

In some embodiments, transition to a third screen 430 may provided in a third state in which the user had confirmed the recognition of the user. In some embodiments, the transition to the third screen may include the icons or symbols of the Home Page become larger and appear to move towards the user in operation of either a 2D or 3D screen operation.

Figure 5:
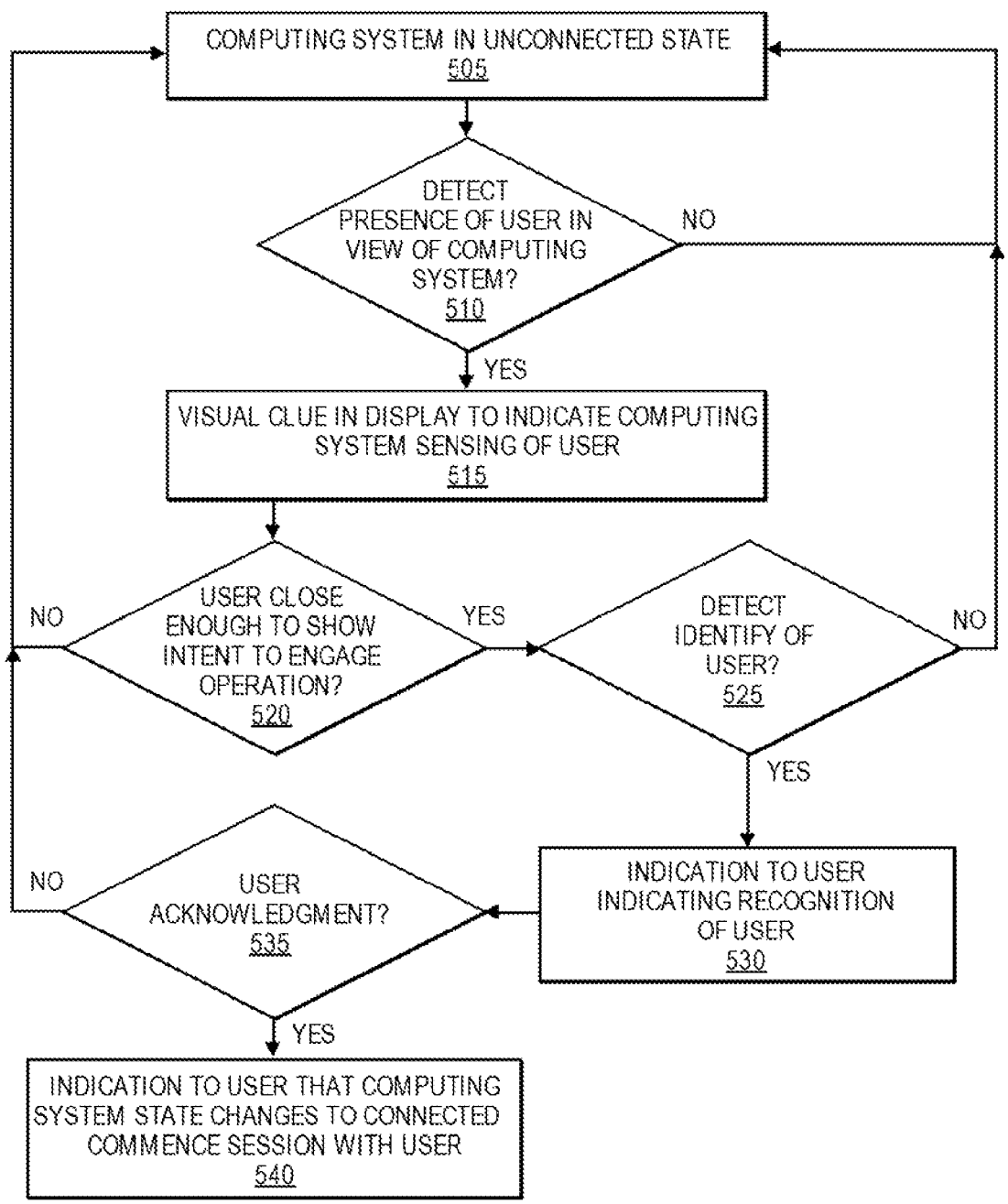
FIG. 5 is a flowchart to illustrate an embodiment of a process for transitioning a state of a computing device to connect with a user.

FIG. 5 is a flowchart to illustrate an embodiment of a process for transitioning a state of a computing device to connect with a user. In some embodiments, a computing system may be in an unconnected state 505, where such state indicates that the computing system is not engaged in a session with a user. In some embodiments, if the computing system detects the presence of a user in sensing range of the computing system 510 (where being in sensing range includes being in range of the computing system viewing, hearing, or otherwise sensing the user), then the computing system provides a visual clue in a display to indicate the sensing of the user by the computing system 515, which a mechanism may include the use of display 410 illustrated in FIG. 4 or a similar display. In some embodiments, there may be determination whether the user is close enough to the computing system to indicate intent to engage the computing system 520. If so, the computing system may attempt to detect the identity of the user 525, such as by facial recognition.

In some embodiments, if the user is recognized, the computing system may provide an indication to the user indicating that the user is recognized 530, where a mechanism to indicate the transition may include the screen transition illustrated as display 420 in FIG. 4 or a similar display.

In some embodiments, the computing system may request or wait for an acknowledgement from the user 535. Upon receiving acknowledgement from the user or otherwise completing the connection process, the computing system may provide an indication to the user that the state of the computing system has changed to connected, and a computing session with the user is commenced 540. In some embodiments, a mechanism to indicate the transition may include the screen transition illustrated as display 430 in FIG. 4 or a similar display.

FIG. 6 is a flowchart to illustrate an embodiment of a process for transitions of a state of a computing system in connection with recognition of gestures by a user. In some embodiments, a computing system may have commenced a session with a user 600, such as illustrated in FIG. 5. In some embodiments, the computing system may use a transition mechanism to determine a location of a virtual boundary for a user, where the location of the virtual boundary may vary with user and context. In some embodiments, the computing system may generate a light, such as an illuminated line, to indicate the virtual boundary for engaging with the computing system 605, such as illustrate as illuminated line 140 generated by light generator 130 in FIG. 1. In some embodiments, the computing system may be in a waiting state, and the light may be produced in a first color (such as blue in this example) 610. In some embodiments, the computing system may detect whether the user has reached past the virtual boundary 615, such as by sensing the presence and movement of the user using sensing elements 120 illustrated in FIG. 1.

In some embodiments, if the user has been detected as having crossed the virtual boundary (such as the hands of the user being closer to the computing system than the virtual boundary line), the computing system may transition to a state for receiving gesture inputs from the user, where a mechanism to indicate the transition may include the light indicating the virtual boundary changing to a second color (such as white) 620.

In some embodiments, the computing system may then determine whether gesture movement is detected 625. If gesture movement is detected, the computing system may proceed with a gesture recognition process 630, which may include the use of data from a gesture data library 635, which may reside in memory in the computing device or may be otherwise accessed by the computing device.

If a gesture if the user is recognized 640, the computing system may perform a function in response to the input 650, and return to receive additional gestures if the user is within the virtual boundary for engaging with the computing system 615. In some embodiments, if the gesture is not recognized, the computing system may transition into an error state, where a mechanism to indicate the error state may include the light indicating the virtual boundary changing to a third color (such as red) 645, with the system return to receive additional gestures if the user is within the virtual boundary for engaging with the computing system 615.

Figure 7:
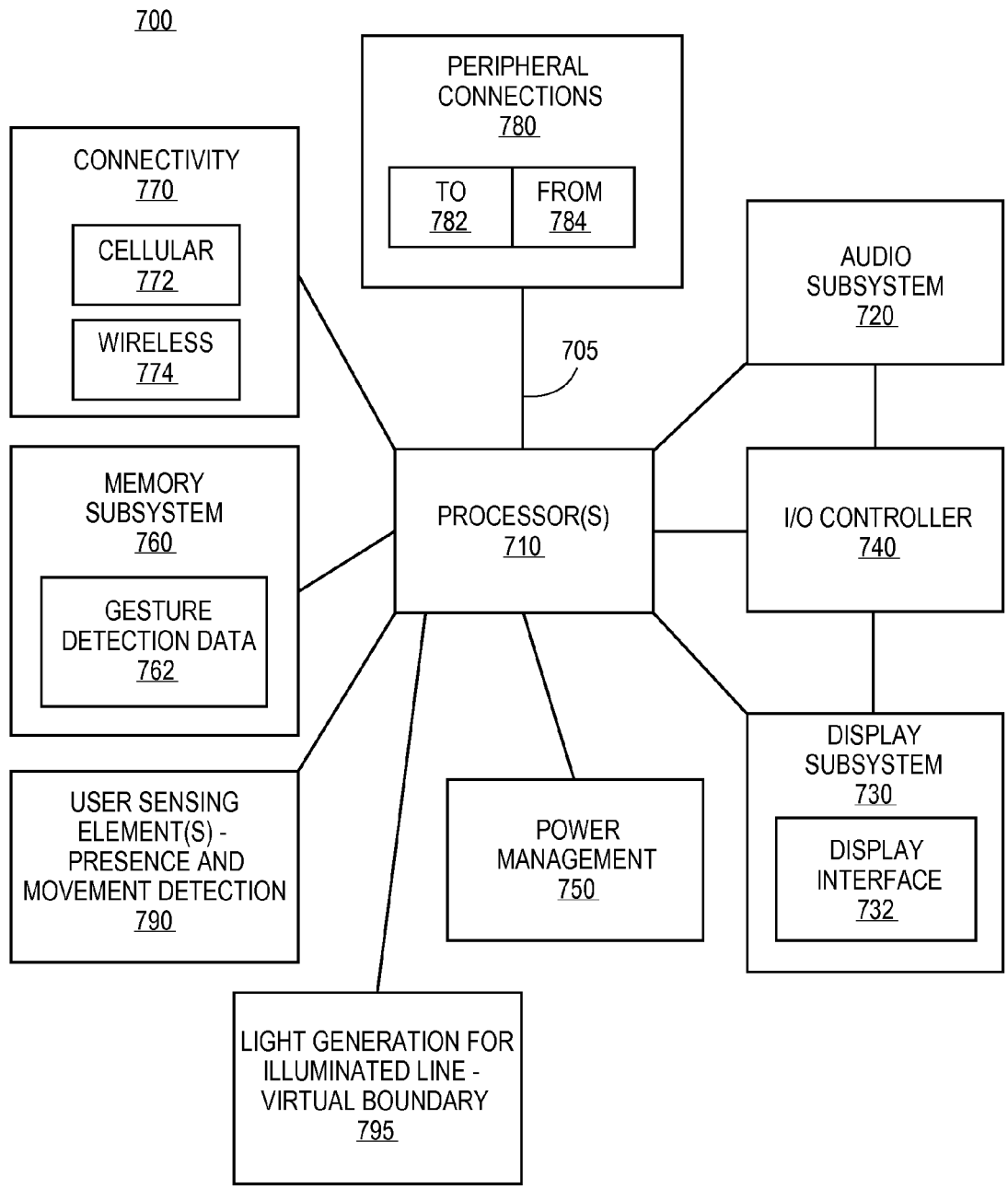
FIG. 7 is a block diagram to illustrate an embodiment a computing system including mechanism to handle transitions for a user in relation to the computing system.

FIG. 7 is a block diagram to illustrate an embodiment a computing system including mechanism to handle transitions for a user in relation to the computing system. Computing system 700 represents any computing device or system utilizing user sensing, including a mobile computing device, such as a laptop computer, computing tablet, a mobile phone or smartphone, a wireless-enabled e-reader, or other wireless mobile device. It will be understood that certain of the components are shown generally, and not all components of such a computing system are shown in computing system 700.

Computing system 700 includes processor 710, which performs the primary processing operations of computing system 700. Processor 710 can include one or more physical devices, such as microprocessors, application processors, microcontrollers, programmable logic devices, or other processing means. The processing operations performed by processor 710 include the execution of an operating platform or operating system on which applications, device functions, or both are executed. The processing operations include, for example, operations related to I/O (input/output) with a human user or with other devices, operations related to power management, and operations related to connecting computing system 700 to another system or device. The processing operations may also include operations related to audio I/O, display I/O, or both. Processors 710 may include one or more graphics processing units (GPUs), including a GPU used for general-purpose computing on graphics processing units (GPGPU).

In some embodiments, computing system 700 includes audio subsystem 720, which represents hardware (such as audio hardware and audio circuits) and software (such as drivers and codecs) components associated with providing audio functions to the computing system. Audio functions can include speaker output, headphone output, or both, as well as microphone input. Devices for such functions can be integrated into computing system 700, or connected to computing system 700. In some embodiments, a user interacts with computing system 700 by providing audio commands that are received and processed by processor 710.

Display subsystem 730 represents hardware (for example, display devices) and software (for example, drivers) components that provide a visual display, a tactile display, or combination of displays for a user to interact with the computing system 700. Display subsystem 730 includes display interface 732, which includes the particular screen or hardware device used to provide a display to a user. In one embodiment, display interface 732 includes logic separate from processor 710 to perform at least some processing related to the display. In one embodiment, display subsystem 730 includes a touchscreen device that provides both output and input to a user.

I/O controller 740 represents hardware devices and software components related to interaction with a user. I/O controller 740 can operate to manage hardware that is part of audio subsystem 720 and hardware that is part of the display subsystem 730. Additionally, I/O controller 740 illustrates a connection point for additional devices that connect to computing system 700 through which a user might interact with the system. For example, devices that can be attached to computing system 700 might include microphone devices, speaker or stereo systems, video systems or other display device, keyboard or keypad devices, or other I/O devices for use with specific applications such as card readers or other devices.

As mentioned above, I/O controller 740 can interact with audio subsystem 720, display subsystem 730, or both. For example, input through a microphone or other audio device can provide input or commands for one or more applications or functions of computing system 700. Additionally, audio output can be provided instead of or in addition to display output. In another example, if display subsystem includes a touchscreen, the display device also acts as an input device, which can be at least partially managed by I/O controller 740. There can also be additional buttons or switches on computing system 700 to provide I/O functions managed by I/O controller 740.

In one embodiment, I/O controller 740 manages devices such as accelerometers, cameras, light sensors or other environmental sensors, or other hardware that can be included in computing system 700. The input can be part of direct user interaction, as well as providing environmental input to the system to influence its operations (such as filtering for noise, adjusting displays for brightness detection, applying a flash for a camera, or other features).

In one embodiment, computing system 700 includes power management 750 that manages battery power usage, charging of the battery, and features related to power saving operation. Memory subsystem 760 includes memory devices for storing information in computing system 700. Memory can include nonvolatile (state does not change if power to the memory device is interrupted) memory devices and volatile (state is indeterminate if power to the memory device is interrupted) memory devices. Memory 760 can store application data, user data, music, photos, documents, or other data, as well as system data (whether long-term or temporary) related to the execution of the applications and functions of system 700. In particular, memory may include gesture detection data 762 for use in detecting and interpreting gestures by a user of the computing system 700.

In some embodiments, computing system 700 includes one or more user sensing elements 790 to sense presence and motion, wherein may include one or more cameras or other visual sensing elements, one or more microphones or other audio sensing elements, one or more infrared or other heat sensing elements, or any other element for sensing the presence or movement of a user.

In some embodiments, computing system 700 includes a light generation element 795 to generate an illuminated line to indicate a location of a virtual boundary for engagement with the computing system 700.

Connectivity 770 includes hardware devices (such as wireless and wired connectors and communication hardware) and software components (such as drivers and protocol stacks) to enable computing system 700 to communicate with external devices. The computing system could include separate devices, such as other computing devices, wireless access points or base stations, as well as peripherals such as headsets, printers, or other devices.

Connectivity 770 can include multiple different types of connectivity. To generalize, computing system 700 is illustrated with cellular connectivity 772 and wireless connectivity 774. Cellular connectivity 772 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity 774 refers to wireless connectivity that is not cellular, and can include personal area networks (such as Bluetooth), local area networks (such as WiFi), wide area networks (such as WiMax), or other wireless communication. Connectivity 770 may include an omnidirectional or directional antenna for transmission of data, reception of data, or both.

Peripheral connections 780 include hardware interfaces and connectors, as well as software components (for example, drivers and protocol stacks) to make peripheral connections. It will be understood that computing system 700 could both be a peripheral device ("to" 782) to other computing devices, as well as have peripheral devices ("from" 784) connected to it. Computing system 700 commonly has a "docking" connector to connect to other computing devices for purposes such as managing (such as downloading, uploading, changing, and synchronizing) content on computing system 700. Additionally, a docking connector can allow computing system 700 to connect to certain peripherals that allow computing system 700 to control content output, for example, to audiovisual or other systems.

In addition to a proprietary docking connector or other proprietary connection hardware, computing system 700 can make peripheral connections 780 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other type.

Figure 8:
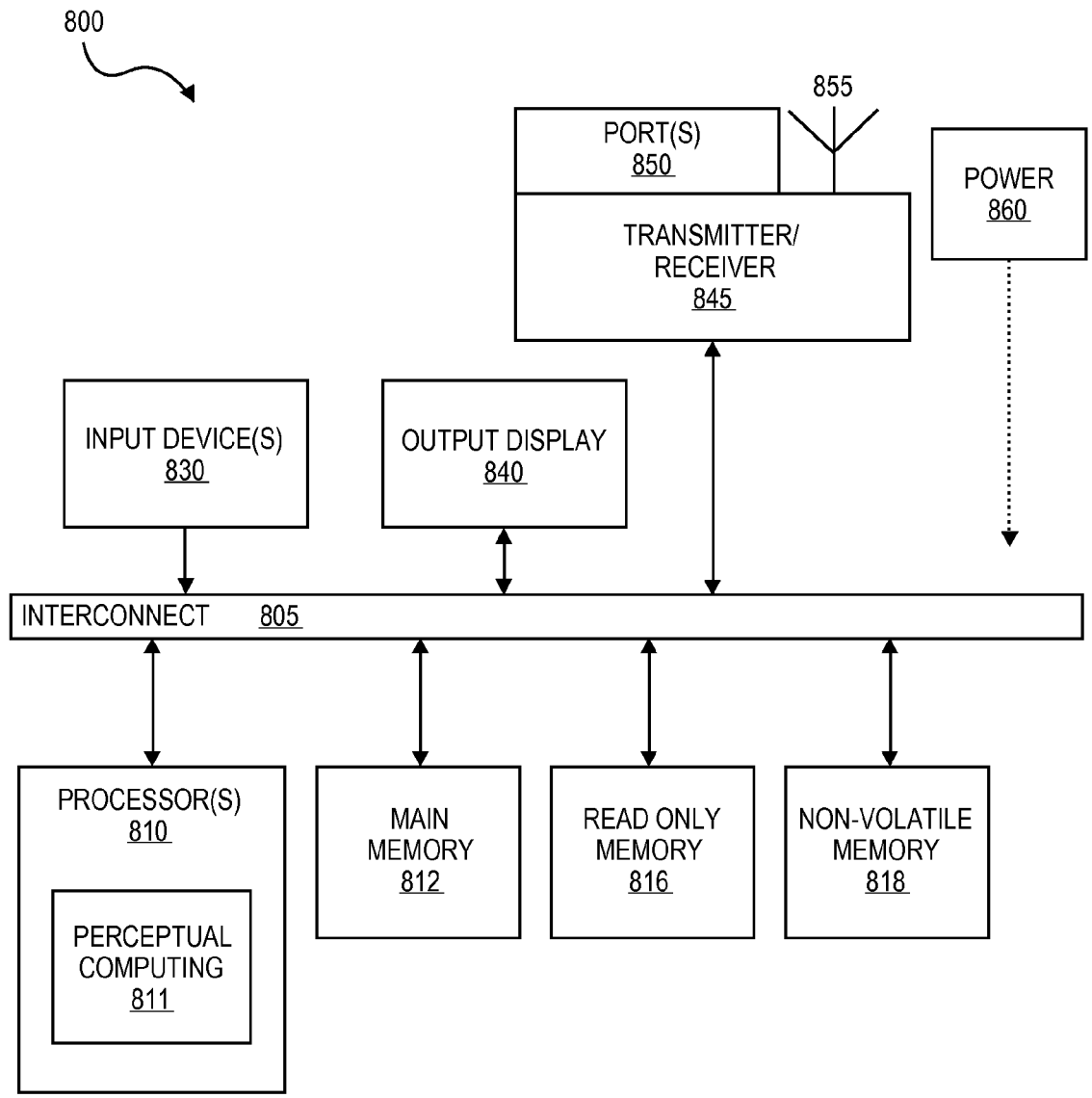
FIG. 8 illustrates an embodiment of a computing system for perceptual computing

FIG. 8 illustrates an embodiment of a computing system for perceptual computing. The computing system may include a computer, server, game console, or other computing apparatus. In this illustration, certain standard and well-known components that are not germane to the present description are not shown. Under some embodiments, the computing system 800 comprises an interconnect or crossbar 805 or other communication means for transmission of data. The computing system 800 may include a processing means such as one or more processors 810 coupled with the interconnect 805 for processing information. The processors 810 may comprise one or more physical processors and one or more logical processors. The interconnect 805 is illustrated as a single interconnect for simplicity, but may represent multiple different interconnects or buses and the component connections to such interconnects may vary. The interconnect 805 shown in FIG. 8 is an abstraction that represents any one or more separate physical buses, point-to-point connections, or both connected by appropriate bridges, adapters, or controllers.

Processing by the one or more processors include processing for perceptual computing 811, where such processing includes sensing and interpretation of gestures in relation to a virtual boundary of the computing system.

In some embodiments, the computing system 800 further comprises a random access memory (RAM) or other dynamic storage device or element as a main memory 812 for storing information and instructions to be executed by the processors 810. RAM memory includes dynamic random access memory (DRAM), which requires refreshing of memory contents, and static random access memory (SRAM), which does not require refreshing contents, but at increased cost. In some embodiments, main memory may include active storage of applications including a browser application for using in network browsing activities by a user of the computing system. DRAM memory may include synchronous dynamic random access memory (SDRAM), which includes a clock signal to control signals, and extended data-out dynamic random access memory (EDO DRAM). In some embodiments, memory of the system may include certain registers or other special purpose memory.

The computing system 800 also may comprise a read only memory (ROM) 816 or other static storage device for storing static information and instructions for the processors 810. The computing system 800 may include one or more non-volatile memory elements 818 for the storage of certain elements.

In some embodiments, the computing system 800 includes one or more input devices 830, where the input devices include one or more of a keyboard, mouse, touch pad, voice command recognition, gesture recognition, or other device for providing an input to a computing system.

The computing system 800 may also be coupled via the interconnect 805 to an output display 840. In some embodiments, the display 840 may include a liquid crystal display (LCD) or any other display technology, for displaying information or content to a user. In some environments, the display 840 may include a touch-screen that is also utilized as at least a part of an input device. In some environments, the display 840 may be or may include an audio device, such as a speaker for providing audio information.

One or more transmitters or receivers 845 may also be coupled to the interconnect 805. In some embodiments, the computing system 800 may include one or more ports 850 for the reception or transmission of data. The computing system 800 may further include one or more omnidirectional or directional antennas 855 for the reception of data via radio signals.

The computing system 800 may also comprise a power device or system 860, which may comprise a power supply, a battery, a solar cell, a fuel cell, or other system or device for providing or generating power. The power provided by the power device or system 860 may be distributed as required to elements of the computing system 800.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs, which are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, floppy diskettes, optical disks, compact disk read-only memory (CD-ROM), and magneto-optical disks, read-only memory (ROM), random access memory (RAM), erasable programmable read-only memory (EPROM), electrically-erasable programmable read-only memory (EEPROM), magnet or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the embodiments of the present invention is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example of the present invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the present invention, various features are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims are hereby expressly incorporated into this description, with each claim standing on its own as a separate embodiment of this invention.

What is claimed is:

1. An apparatus comprising:
   a sensing element to sense a presence or movement of a user of the apparatus;
   a processor, wherein operation of the processor includes interpretation of user gestures to provide input to the apparatus; and
   a light generation element to generate a light to indicate existence of a virtual boundary of the apparatus;
   wherein the apparatus is to establish a location of the virtual boundary for the user, establishing the location of the virtual boundary for the user including establishing the location based at least in part on one or more of an identity of the user and a context of operation; and
   wherein the apparatus is to change from a first state to a second state upon the sensing element sensing that at least a portion of the user is within the virtual boundary.

2. The apparatus of claim 1, wherein the virtual boundary is an imaginary line or plane in space at a certain location.

3. The apparatus of claim 2, where the location of the virtual boundary is to be related to a location of the apparatus or to a location of the user.

4. The apparatus of claim 2, wherein the light is to indicate the location of the virtual boundary.

5. The apparatus of claim 2, where the light and the virtual boundary are to be at different locations.

6. The apparatus of claim 1, wherein the first state is a waiting state and the second state is a state for receiving inputs from the user by detecting gestures of the user.

7. The apparatus of claim 1, wherein the light includes an illuminated line.

8. The apparatus of claim 1, wherein the light generation element is to produce a different color of light for each of a plurality of states.

9. The apparatus of claim 1, further comprising a library of gesture data, the processor to utilize the library of gesture data in interpretation of user gestures.

10. The apparatus of claim 1, further comprising a display screen, wherein the apparatus is to present a plurality of images on the display screen to indicate establishment of a connected state for the apparatus, the presentation of the plurality of images including a change of an aspect of the display screen based on sensed presence or movement of the user.

11. A method comprising:
establishing a location of a virtual boundary of a computing system for a user, wherein establishing the location of the virtual boundary for the user includes establishing the location based at least in part on one or more of an identity of the user and a context of operation;
generating a light to indicate existence of the virtual boundary for the computing system;
sensing a presence or movement of the user, wherein the sensing includes interpretation of user gestures to provide input to the computing system; and
changing the computing system from a first state to a second state upon sensing that at least a portion of the user is within the virtual boundary.

12. The method of claim 11, wherein the virtual boundary is an imaginary line or plane in space at a certain location in relation to the computing system or the user.

13. The method of claim 12, wherein generating the light includes generating a light that indicates the location of the virtual boundary.

14. The method of claim 11, wherein the first state is a waiting state and the second state is a state for receiving inputs from the user by detecting gestures of the user.

15. The method of claim 11, wherein generating the light includes generating an illuminated line.

16. The method of claim 11, wherein generating the light includes generating a different color of light for each of a plurality of states.

17. The method of claim 11, further comprising displaying a plurality of images on a display screen for establishing a connected state for the apparatus, the presentation of the plurality of images including changing an aspect of the display screen based on sensed presence or movement of the user.

18. A non-transitory computer-readable storage medium having stored thereon data representing sequences of instructions that, when executed by a processor, cause the processor to perform operations comprising:
establishing a location of a virtual boundary of a computing system for a user, wherein establishing the location of a virtual boundary for the user includes establishing the location based at least in part on one or more of an identity of the user and a context of operation;
generating a light to indicate existence of the virtual boundary for the computing system;
sensing a presence or movement of the user, wherein the sensing includes interpretation of user gestures to provide input to the computing system; and
changing the computing system from a waiting state to a state for receiving inputs from the user by detecting gestures of the user upon sensing that at least a portion of the user is within the virtual boundary.

19. The medium of claim 18, wherein the virtual boundary is an imaginary line or plane in space at a certain location in relation to the computing system or the user, wherein the generating the light includes generating a light that indicates the location of the virtual boundary.

* * * * *